United States Patent [19]

Li

[11] Patent Number: 4,788,869
[45] Date of Patent: Dec. 6, 1988

[54] APPARATUS FOR MEASURING FLUID FLOW

[75] Inventor: Paul Z-f. Li, Tallahassee, Fla.

[73] Assignee: Florida State University, Tallahassee, Fla.

[21] Appl. No.: 879,628

[22] Filed: Jun. 27, 1986

[51] Int. Cl.$^4$ .............................................. G01F 1/28
[52] U.S. Cl. .................................. 73/861.71; 73/189; 73/861.74
[58] Field of Search ................................ 73/861-871, 73/861.74, 189

[56] References Cited

U.S. PATENT DOCUMENTS

| | | | |
|---|---|---|---|
| 2,739,476 | 3/1956 | Atkins | 73/155 |
| 2,773,236 | 12/1956 | Martin et al. | 324/2 |
| 3,164,990 | 1/1965 | Henness et al. | |
| 3,203,236 | 8/1965 | Prince | 73/189 |
| 3,494,190 | 2/1970 | Schwartzman | |
| 3,530,714 | 9/1970 | Akeley | 73/861.75 |
| 3,681,987 | 8/1972 | Ruskin | 73/861.71 |
| 3,964,306 | 6/1976 | Fletcher et al. | |
| 4,262,544 | 4/1981 | Herzl | 73/861.24 |
| 4,343,198 | 8/1982 | Jendrzejczyk | 73/862.65 |
| 4,631,959 | 12/1986 | Motycka | 73/861.71 X |

FOREIGN PATENT DOCUMENTS

| | | | |
|---|---|---|---|
| 1200114 | 2/1986 | Canada | 73/189 |
| 183970 | 4/1955 | Fed. Rep. of Germany | |
| 0754310 | 8/1980 | U.S.S.R. | |
| 0998957 | 2/1983 | U.S.S.R. | 73/189 |

OTHER PUBLICATIONS

Dessureault et al, "Design Of A Tri-Axial Anemometer For Measurment of Atmospheric Turbulence Over Water", in Ocean Eng., vol. 7, 1980, pp. 521-537.
Donelan et al, "Miniature Drag Sphere Velocity Probe", in Rev. Sci. Inst. 49(3), 3/78, pp. 298-304.

*Primary Examiner*—Herbert Goldstein
*Attorney, Agent, or Firm*—Dennis P. Clarke

[57] ABSTRACT

Apparatus for measuring flow rate and flow direction of a fluid comprises an elongated stem coaxially disposed and supported within an elongated housing, a small diameter spherical probe connected to an end of the stem which projects through an opening in the housing for transmitting to the stem forces exerted on the probe by the flowing fluid, and a sensor for detecting the forces transmitted to the stem and for producing electrical signals representative of a measurement of the flowing fluid. The apparatus may detect forces exerted on the probe in one, two or three orthogonal directions, thereby providing output signals corresponding to the components of a vector representation of the fluid flow.

19 Claims, 6 Drawing Sheets

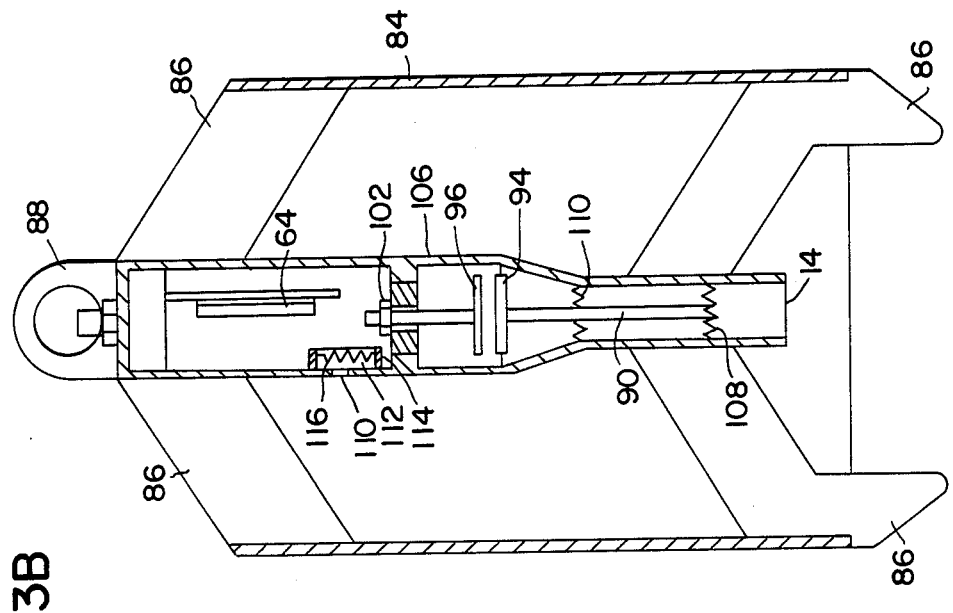
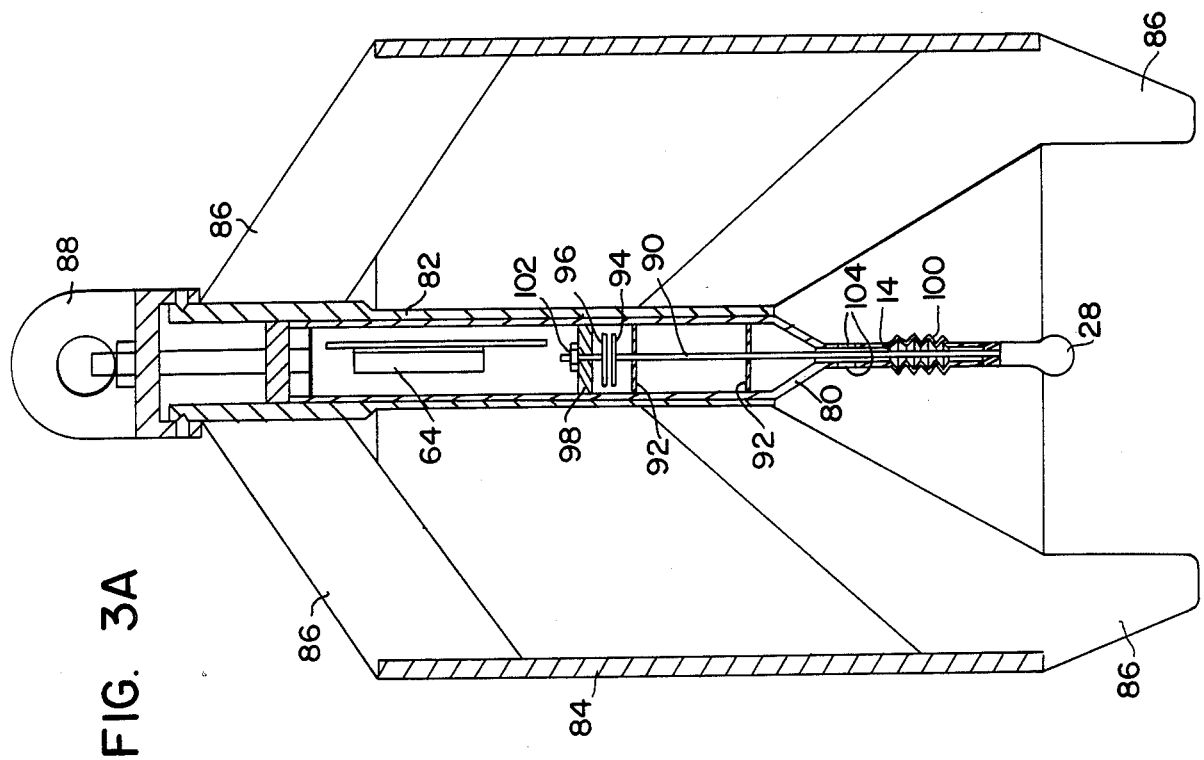
FIG. 3B
FIG. 3A

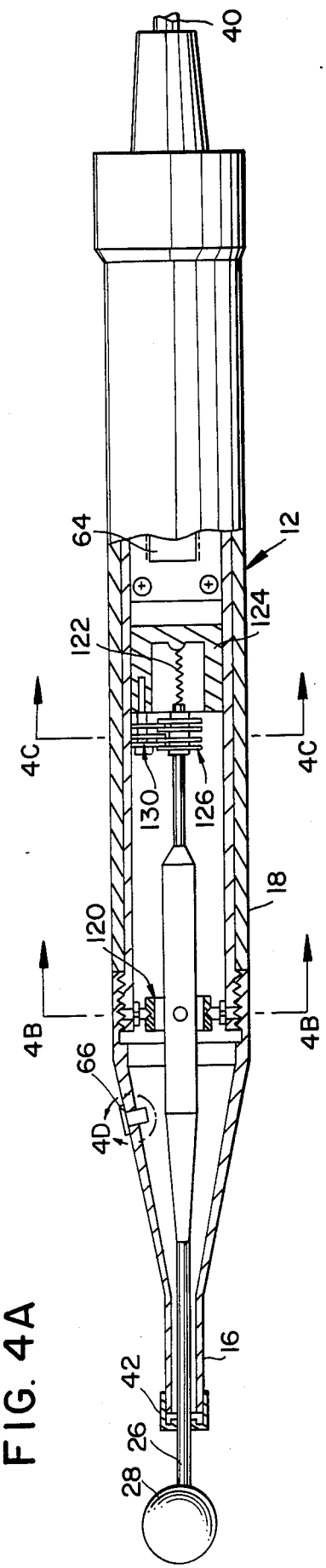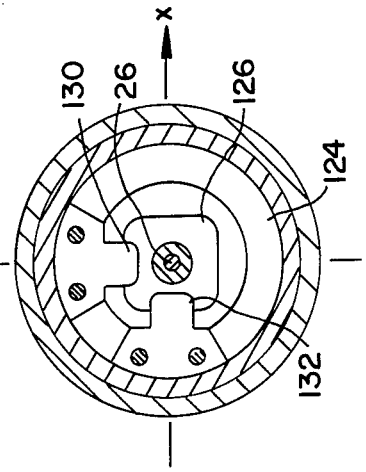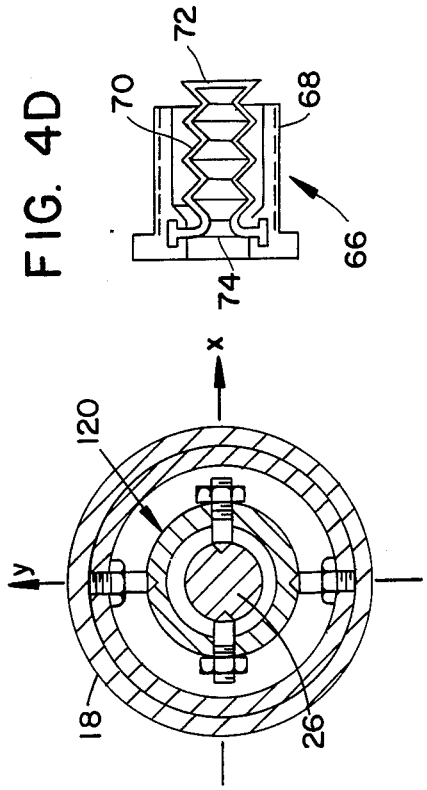

4,788,869

APPARATUS FOR MEASURING FLUID FLOW

BACKGROUND OF THE INVENTION

This invention relates to apparatus for measuring flow parameters of a fluid such as flow rate and direction, and more particularly to improved transducer apparatus for this purpose.

Many different types of transducers are known for measuring flow parameters. Examples of known transducers include hot-wire anemoneter resistive-type devices, rotary cup devices, axial flow propeller rotary devices, and pressure-sensing devices which rely upon the deflection of a diaphragm or some other member to measure flow rate. Also known are electrofluid magnetic, optical, and sonic doppler-type devices. Known flow transducer devices have a number of disadvantages. Many are non-directional, being unable to discriminate between differences in flow direction, or have poor directional resolution. Many are bulky and have poor spatial or temporal resolution, and additionally cause perturbations in the flow medium being measured which lead to inaccuracies in the measurements. Some devices are expensive or require complicated processing, and many are unsuited for use in hostile environments. Many known devices also do not have sufficient sensitivity to measure very small changes in flow parameters, or are subject to error due to the effects of gravity or to the static pressure of the flow medium in which they are employed.

In some applications, such as investigating fluid flow through a channel or across an airfoil, it is necessary to develop flow gradients. This requires measuring the flow rate and direction at a plurality of points. The transducers employed for measuring the fluid flow must have good spatial, directional, and temporal resolution, and good sensitivity. Furthermore, the perturbations induced in the flowing fluid by the presence of the transducers must be minimized, and the calibration of the transducers themselves must remain unaffected by changes in their positions or the static pressure of the flowing fluid. U.S. Pat. No. 3,964,306 to Fletcher et al discloses a moving magnetic armature electromagnetic flow transducer, based upon a stereophonic phonograph cartridge, which employs a spherical probe. Although this transducer has good spatial resolution and is capable of measuring the components of flow velocity in two dimensions, it has a rather bulky structure which disturbs the fluid flow in the vicinity of the probe, and it suffers from other disadvantages.

It is desirable to provide transducer apparatus for measuring flow parameters of a fluid which avoids the foregoing and other disadvantages of known transducer apparatus, and it is to this end that the present invention is directed.

SUMMARY OF THE INVENTION

The invention affords apparatus for measuring parameters of a fluid flow which has a rather simple, rugged, and inexpensive construction that minimizes perturbations or distortions in the flow caused by the presence of the apparatus, has good spatial, directional, and temporal resolution, and has high sensitivity. Apparatus in accordance with the invention may also be compensated for the effects of gravity and the static pressure of the flow medium in which it is employed, thereby avoiding the necessity for recalibration of the apparatus with changes in position or pressure of the fluid.

Briefly stated, apparatus in accordance with the invention for measuring the flow of a fluid may comprise an elongated housing having an opening in one end. An elongated stem projects longitudinally from the housing through the opening and has a probe attached to the projecting end for interaction with the flowing fluid and for transmitting to the stem forces exerted on the probe by the flowing fluid. The stem is supported within the housing at a location remote from the opening, and sensor means is included within the housing for sensing the forces transmitted to the stem by the probe and for producing corresponding electrical signals representative of a measurement of the flowing fluid.

BRIEF DESCRIPTION OF THE DRAWINGS

FIGS. 3A-B are longitudinal cross sectional views of other embodiments of apparatus in accordance with the invention which are useful in well logging and the like for measuring flow parameters in an axial direction of a fluid flowing through a conduit;

FIGS. 4A-D illustrate another embodiment of apparatus in accordance with the invention, FIG. 4A being a side view partially broken away of the apparatus, FIGS. 4B and 4C being, respectively, transverse cross sectional views taken approximately along the lines 4B-4B and 4C-4C of FIG. 4A, and FIG. 4D being an enlarged cross sectional view of a pressure compensating device of the apparatus;

FIGS. 6B and C being, respectively, enlarged perspective and longitudinal cross sectional views of a sensor employed by the apparatus;

DESCRIPTION OF PREFERRED EMBODIMENTS

Flow measurement apparatus in accordance with the invention may take different forms and may find utility in many different applications for measuring the flow parameters of either liquids or gases. The apparatus may be constructed to measure the magnitude of the flow rate in either one, two or three dimensions, thereby affording a vector measurement of flow rate. In the description which follows, several different embodiments and applications of apparatus in accordance with the invention will be described. As will be appreciated, however, the invention may take other forms.

Figure 1A:
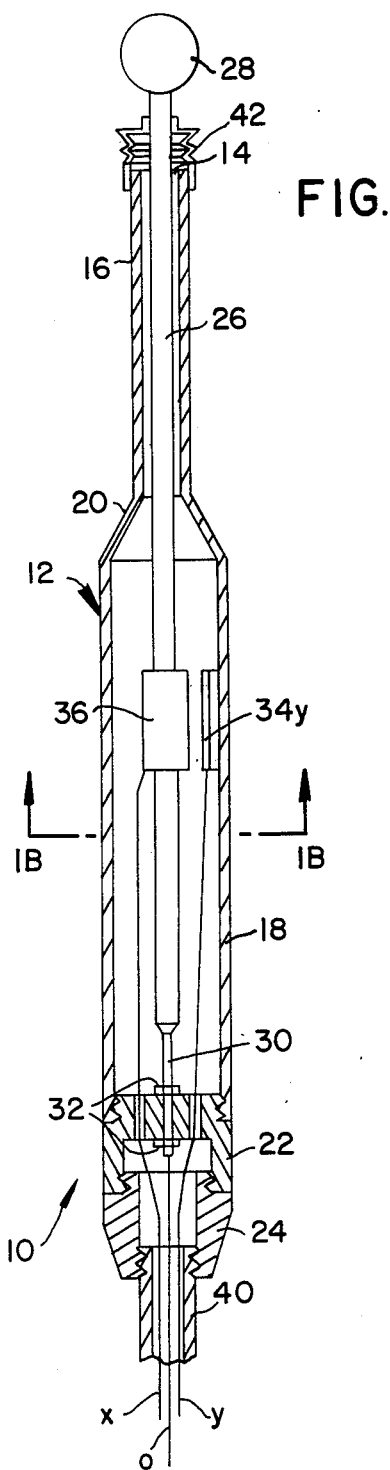
FIGS. 1A-B are, respectively, longitudinal and transverse cross sectional views of flow measuring apparatus in accordance with a first embodiment of the invention for measuring flow parameters in two dimensions.
Figure 1B:
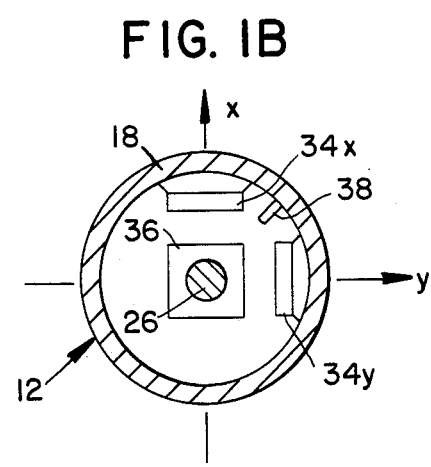

FIGS. 1A-B illustrate a first embodiment of flow measuring apparatus 10 (referred to hereinafter as a "flowmeter") in accordance with the invention. As shown, the flowmeter may comprise an elongated tubular housing or sheath 12 having an opening 14 in one end thereof. The housing may have first and second tubular portions 16 and 18, respectively, of different diameters, which are connected together by a tapered portion 20. Portion 16 of the housing adjacent to opening 14 may be quite slender and have a diameter which is smaller than portion 18. The opposite end of the housing from opening 14 may be closed and sealed by an annular member 22 threaded into portion 18 and by an end cap 24 threaded into the annular member, as shown. An elongated stem 26 may be coaxially disposed and supported within the housing such that one end of the stem projects through opening 14, and a spherical ball or probe 28 may be attached to the projecting end of the stem. Stem 26 is preferably supported within the housing at a location remote from opening 14. As will be described shortly, the larger diameter tubular portion 18 of the housing may enclose sensors and electronic or other components, and the smaller diameter tubular portion 16 minimizes disturbance in the vicinity of the probe to the fluid medium in which the flowmeter is inserted.

In the form of the invention illustrated in FIG. 1A, the stem may be supported cantilevered by connecting its end 30 opposite to its projecting end to annular member 22, as by threading the end 30 and securing it to the annular member with nuts 32, as shown. Stem 26 may comprise a rod of resilient material, such as stainless steel, having a short reduced diameter section at end 30. This reduced diameter section of the rod serves as an integral spring which enables the rod to bend slightly away from the longitudinal axis of the housing upon forces being exerted on probe 28 in a direction transverse to the longitudinal axis. Thus, by inserting the flowmeter into a flowing fluid medium with the longitudinal axis of the flowmeter transverse to the direction of fluid flow, the forces exerted on the probe by the flowing fluid will cause the stem to bend and deviate from the longitudinal axis in accordance with the magnitude of the flow rate and the direction of flow. This deviation may be sensed to provide a measure of the flow parameters of the fluid. Since the diameter of probe 28 may be quite small, it allows the flow in a very small area to be measured and, thus, affords very good spatial resolution. The slim tapered configuration of the housing, and in particular the slender portion 16, minimizes the distortion or pertubation of the flow due to presence of the flowmeter. The diameter of portion 16 of the housing need only be large enough to accommodate the maximum expected deviation of the stem, which may be quite small, and the length of portion 16 is preferably such that it surrounds the stem to a point close to the probe. It thus acts as a sheath for the stem and insures that the deviation of the stem is due substantially entirely to the forces exerted by the fluid on the probe and not to forces exerted on the stem. FIGS. 1A-B illustrate one form of a sensor system which may be employed for detecting the deviation of the stem, as will now be described.

As shown in the figures, a pair of sensors 34x and 34y may be disposed within the housing adjacent to the stem at an intermediate location between the two ends of the stem. The two sensors may comprise conventional magnetic or capacitive displacement-type sensors oriented at right angles to one another, as shown in FIG. 1B, and the region 36 of the stem adjacent to the sensors may be formed to have an enlarged cross sectional area and to provide cooperatively shaped surfaces adjacent to the two sensors. As shown, the surfaces of the sensors and region 36 may be substantially planer and of approximately the same dimensions. Sensors 34x and 34y sense the deviation of the stem from the longitudinal axis in transverse orthogonal x and y directions and provide corresponding output signals. These signals correspond to the components of a vector which represents the flow magnitude and direction in a plane transverse to the longitudinal axis of the flowmeter.

As shown in FIG. 1B, an inwardly projecting shield 38 may be located between the two sensors to minimize mutual coupling and afford better isolation between the sensors. If desired, conventional strain gauges may be affixed to stem 26 at right angles to one another for measuring the deflection of the stem, rather than using displacement-type sensors.

The signals from sensors 34x and 34y may be output from the flowmeter via corresponding electrical conductors x and y, along with a common reference conductor 0 connected to stem 26, of a cable 40 connected to end cap 24, as shown in FIG. 1A. Opening 14 at the opposite end of the housing may be closed by a flexible elastomeric membrane or bellows 42 connected to the stem and to the external surface of the housing adjacent to opening 14, as shown, in order to seal the interior of the housing from the fluid medium. In addition to sealing the housing, the bellows also provides some damping for the stem. Probe 28 may comprise a hollow metal ball, as of stainless steel, for example, and may be constructed to have a size and weight in relation to the density of the fluid medium such that it has neutral bouyancy.

As noted above, flowmeter 10 provides two-dimensional information on the fluid flow. It gives not only the magnitude of the flow rate, but also the direction of the flow. It is useful for measuring the flow in a channel such as a wave tank or the like, and is particularly useful for developing a flow gradient profile. For this purpose, a plurality of flowmeters of the type illustrated in FIGS. 1A-B may be supported on a member positioned transverse to the flow in the channel and such that the probes of the flowmeters are disposed in the fluid along a line at which it is desired to measure the flow gradient in the channel. The flowmeter may, of course, be constructed to provide flow information in a single dimension by employing a single sensor. Such a flow meter is useful for measuring the flow rate through a conduit, for example, and FIG. 2 illustrates another embodiment of the invention constructed particularly for this purpose.

Figure 2:
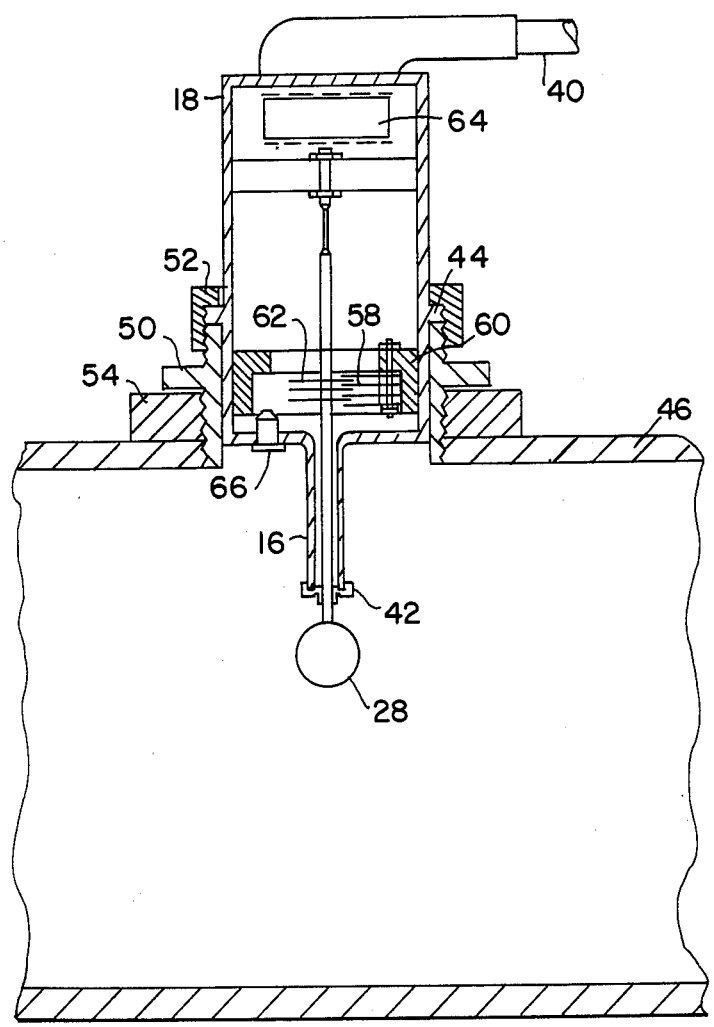
FIG. 2 is a cross sectional view of another embodiment of flow measuring apparatus in accordance with the invention for measuring one-dimensional flow parameters of a fluid flowing through a conduit.

Referring to FIG. 2, wherein the same reference designators are employed for like elements, the enlarged tubular portion 18 of the housing may be formed with a projecting flange 44 at its external surface and sized to have an outer diameter which enables the flowmeter to be connected to a pipe or conduit 46 using a standard conventional coupling 48 comprising a threaded, flanged adapater 50 and an annular pressure ring 52. The outer diameter of portion 18 o the housing may be selected to conform to the inner diameters of the adaptor and the annular pressure ring, and flange 44 may be sized to support the housing on the top of the adaptor and to enable the housing to be connected to the adaptor by the pressure ring, as shown. Adaptor 50 may be threaded into an opening formed in the sidewall of pipe 46 and in a pedestal 54 welded to the sidewall, as shown. The elongated small diameter portion 16 of the housing adjacent to probe 28 may be connected to enlarged portion 18 by a radially extending portion 56 located with respect to flange 44 such that it is located within the length of adaptor 50, in order to minimize distortion of the fluid flow in the pipe.

As is well known, the velocity profile of fluid flow within a straight pipe of constant diameter varies smoothly from zero at the pipe sidewalls to a maximum at the center of the pipe. The length of stem 26 may be selected so as to position the center of probe 28 at a distance from the sidewall at which the average velocity of the fluid flow occurs so that the flowmeter measures the average flow rate.

The flowmeter of FIG. 2 may employ as a sensor a variable parallel plate capacitor comprising a plurality of stationary spaced plates 58 supported on an annular ring 60 within the housing and a corresponding plurality of movable spaced plates 62 connected to stem 26 so as to interleave the stationary plates. The capacitor plates are disposed within the flowmeter housing such that they lie along a line which is parallel to the axis of pipe 46. Thus, as probe 28 moves in an axial direction of the pipe in response to the forces exerted on it by the axial fluid flow, stem 26 bends and causes the overlapping areas of the stationary and movable capacitor plates to vary. In other words, stem 26 causes a variation in the capacitive coupling between the stationary capacitor plates or elements and the movable capacitor plates or elements. Since the capacitance of a parallel plate capacitor is a function of the area of the plates which overlap, this varies the capacitance of the capacitor in accordance with the deviation of the stem from the longitudinal axis of the flowmeter, and the variation in capacitance may be detected to provide a measure of the average flow rate. This may be accomplished, for example, by using a capacitance bridge, or by using the capacitor in the frequency determining network of an oscillator, such as an integrated circuit RC oscillator 64 disposed within the housing, and detecting the frequency variation of the oscillator output caused by bending of the stem. Other types of sensors may, of course, be used. However, a capacitance sensor is advantageous in that it is relatively simple and inexpensive, and poses no resistance to the movement of the probe. Furthermore, small changes in capacitance can provide rather large changes in the output frequency of an oscillator, which permits very good sensitivity and resolution in detecting small deviations, e.g., of the order of a microinch, of the stem from its "zero" position. Integrated circuit 64 may be, for example, a type ICL 8038 precision waveform generator/voltage controlled oscillator available from Radio Shack. This integrated circuit has excellent frequency response, temperature and voltage stability, and very good linearity between output frequency and capacitance. The output signal from the oscillator may be fed via cable 40 to a processing system, to be described more fully hereinafter, where it may be processed to provide an indication of flow rate.

Depending upon the difference between the static pressure of the fluid in pipe 46 and the static pressure within the housing of the flowmeter, some distortion of the elastomeric membrane or bellows 42, which seals the interior of the housing from the fluid medium may occur. This distortion could change the elasticity of the membrane, thereby affecting the calibration of the flowmeter, as well as affect the sealing ability of the membrane. To avoid this, the flowmeter may employ a static pressure compensation device 66 to minimize the pressure differential between the interior of the housing and the fluid, and this static pressure compensation device 66 may take the form illustrated in FIG. 4D. As shown therein, compensation device 66 may comprise a threaded tubular member 68 adapted to be threaded into a sidewall of the housing, and an elastomeric bellows 70 having one flat closed end 72 which is free to move and an opposite open fixed end 74 which is connected to tubular member 68. The bellows expands and contracts in response to forces exerted on it so that its free end moves with respect to its fixed end. As indicated in FIG. 2, static pressure compensation device 66 may be threaded into portion 56 of the housing such that the open end 74 and the interior of the bellows is in communication with the interior of pipe 46 and such that the exterior of the bellows is in communication with the interior of the housing. Accordingly, the static pressure of the fluid within pipe 46 causes the bellows to expand into the interior of the housing. Since the housing is sealed, and may be pressurized with a fluid or some other dielectric material, such as transformer oil or silicon grease, the expanding bellows exerts a pressure on the material within the housing. This, in turn, causes an increased pressure to be applied to the inner surface of sealing bellows 42 to counteract the external pressure applied to bellows 42 so that the bellows retains its shape and elasticity, thus compensating for the pressure differential between the static pressure of the fluid in pipe 46 and the pressure in the interior of the flowmeter. Other forms of static pressure compensation may also be employed, as described more fully hereinafter.

The use of a dielectric, such as transformer or silicon oil, to fill the interior of the flowmeter is advantageous in that it increases the sensitivity of the device, affords damping of the stem, and assists in preventing moisture, water or air, which could change the calibration, from entering the housing. The dielectric also facilitates static pressure compensation, thereby assuring proper and stable working of the device in different ambient conditions and at different working depths. This is important for well logging, deep sea current measurement, submarine, or high altitude applications. Preferably, the dielectric used has a low thermal expansion coefficient, low evaporation rate, high boiling and low freezing points, and low loss in high frequency operation. Transformer or silicon oils meet these criteria.

The flowmeters of FIGS. 1A-B and 2 measure flow parameters in a direction transverse to their longitudinal axes. FIGS. 3A-B illustrate two different embodiments of one-dimensional flowmeters in accordance with the invention for measuring flow parameters in a direction parallel to the axis of the flowmeter. These flowmeters are particularly useful for well logging applications and the like, and are substantially similar except that the flowmeter of FIG. 3A measures hydrodynamic forces, whereas the flowmeter of FIG. 3B measures hydrostatic forces.

Referring to FIG. 3A, a one-dimensional axial flowmeter 80 in accordance with the invention may have an elongated housing similar to that of the flowmeter of FIG. 1A. Flowmeter 80 may be disposed within a tubular member 82 coaxially disposed with respect to a carrier comprising a cylindrical member 84 having an outer diameter corresponding to the inner diameter of the well bore or conduit within which the flowmeter is employed. Tubular member 82 may be supported within the cylindrical member 84 by a spider arrangement comprising a plurality of thin (in a plane normal to that of the drawing to minimize disturbance to the axial fluid flow) legs 86, and may have a hoist ring 88 to enable connection of the carrier to a hoist cable (not illustrated). Flowmeter 80 may employ a generally spherical probe 28 connected to a projecting end of a stem 90 which is supported for axial movement within the housing by a pair of diaphragm springs 92, as shown. A movable capacitor plate 94 may be attached to the opposite end of the stem from the probe and positioned adjacent to a fixed capacitor plate 96 supported within the housing on a cross member 98. An elastomeric bellows 100 (similar to bellows 42) may coaxially surround stem 90 and be connected to the stem adjacent to probe 28 and to the housing adjacent to opening 14 in its lower end. This arrangement enables the stem to move axially with respect to the flowmeter housing in response to axially directed forces applied to probe 28 so as to vary the spacing between the fixed and movable capacitor plates and, thus, the capacitance. As in the embodiment of FIG. 2, the variation in capacitance caused by axial movement of stem 90 may vary the frequency of an integrated circuit RC oscillator 64 and the frequency variation may be related to the flow rate. Fixed plate 96 of the capacitor may be connected to a zero adjustment screw 102 or the like to enable the spacing between the fixed and movable plates to be adjusted for calibration purposes. Static pressure compensation for the flowmeter may be afforded by a pair of small diameter holes 104 located in the side wall of the small diameter portion 196 of the housing. Holes 104 connect the interior of the housing with its exterior, and equalize the pressure applied to the two sides of the bellows 100.

Flowmeter 1096 of FIG. 3B is somewhat similar to flowmeter 80 in that it employs movable and fixed capacitor plates 94 and 996, respectively, and an axially movable stem 90 connected to the movable capacitor plate, but differs in that the stem 90 is connected to a pressure diaphragm 108 located inwardly from opening 14 of the flowmeter housing. A second spring diaphragm 110 may support stem 90 at an intermediate location.

Pressure diaphragm 108 responds to the axial fluid pressure of the fluid flowing through the conduit or well bore within which the flowmeter is disposed to vary the capacitance of the capacitor formed by the movable and fixed plates and change the frequency of the integrated circuit oscillator 964. The interior of the housing of flowmeter 1096 may be filled with a dielectric, such as transformer oil or silicon grease, and static pressure compensation may be afforded by means of a small hole 110 in the side wall of the housing which communicates with a static pressure compensation chamber 112 formed by an annular member 114 and a flexible elastomeric diaphragm 1196. When the static pressure of the fluid medium is greater than the pressure within the housing, diaphragm 1196 deforms so that it exerts pressure on the dielectric material within the housing to equalize the interior pressure of the housing to that of the fluid.

The embodiments of the invention illustrated in FIGS. 1A-B and 2 employ an unbalanced or cantilevered stem. As such, gravitational forces exerted on the probe may cause some bending of the stem and require recalibration of the flowmeter when its working position is changed. The embodiment illustrated in FIGS. 4A-D employs a balanced stem and can be used in different working positions without recalibration. As shown, the flowmeter of FIG. 4A has an elongated tapered housing similar to that of FIG. 1A, which affords a small diameter portion 196 adjacent to probe 28. Stem 296 is supported within the housing at an intermediate location of the stem by a gimbal 120 (shown in more detail in FIG. 4B) which affords movement of the stem in two orthogonal directions x and y transverse to the longitudinal axis of the stem. The gimbal preferably supports the stem at the center of gravity of the stem and probe so that the stem is balanced about the gimbal. A centering spring 122 may be connected between the interior end of the stem and an annular member 124 disposed within the housing, as shown. The centering spring, which is coaxial with the axis of the stem, assists in maintaining the axis of the stem coaxial with the longitudinal axis of the housing in the absence of fluid forces exerted on the probe. Instead of spring 122, centering of the stem may also be accomplished by means of small helical watch-type springs on the pivots of gimbal 120.

The embodiment of FIG. 4A provides flow information in two orthogonal directions transverse to the longitudinal axis of the housing. Transverse forces exerted on probe 28 are transmitted to the stem, and the stem pivots in gimbal 120 about the gimbal axes. In order to detect the deviation of the stem in two dimensions from the longitudinal axis of the housing, two orthogonally oriented variable capacitor sensors of the type previously described may be employed. A plurality of movable capacitor plates 1296 may be disposed on the end of the stem adjacent to spring 122, and two sets of fixed orthogonally oriented sets of capacitor plates 130 and 132 may be connected to member 124 (as best illustrated in FIG. 4C) for cooperation with the movable plates. The two sets of stationary plates are oriented so that a line through the center of each set of plates and the stem is parallel to a corresponding transverse x or y axis of gimbal 120. The two sets of stationary plates cooperate with the common movable plate 1296 on the stem to form two variable capacitors, each of which may be employed to control the frequency of an associated oscillator, as previously described. As shown in FIG. 4C, the movable plates 1296 may have a generally square configuration, and the portions of the stationary plates which overlap the movable plates have a smaller transverse dimension than the dimension of the corresponding side of the movable plates. Thus, when the stem pivots in the gimbal such that its end moves parallel to one of the gimbal axes, the change in capacitance of the correspondingly oriented capacitor is greater than the change in capactance of the capacitor located at right angles to the direction of movement. The output frequencies of the two oscillators associated with the two variable capacitors thus correspond the components of a vector which represents to the magnitude and direction of the fluid flow.

As previously noted, the embodiment of FIG. 4A employs a static pressure compensation device 9696 (illustrated in FIG. 4D) for compensating for the pressure differential between the internal pressure of the housing and the static pressure of the fluid medium in which the flowmeter is used.

Figure 5:
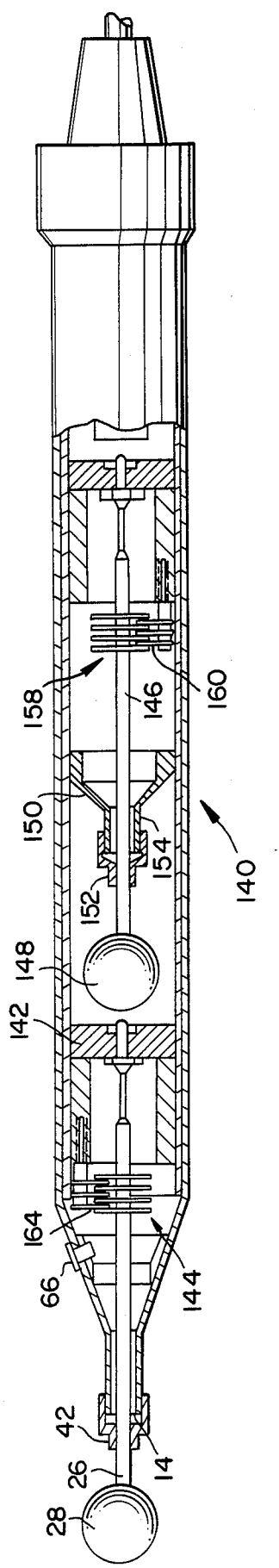
FIG. 5 is a side view partially broken away of another embodiment of apparatus in accordance with the invention which is compensated for the effects of gravitational forces.

FIG. 5 illustrates an embodiment of a flowmeter 140 in accordance with the invention which employs an unbalanced cantilevered stem configuration, but which is gravity compensated so that its working position may be varied without recalibration. As shown, stem 296 is cantilevered from the center of a transverse portion of an annular member 142 disposed within the housing of the flowmeter. The stem projects through opening 14 of the housing and has a spherical probe 28 connected thereto. An elastomeric membrane 42 seals opening 14 of the housing, as previously described. A variable capacitance-type sensor 144 of the type previously described may be employed for sensing the deviation of stem 296 from the longitudinal axis of the housing in response to flow forces exerted in a transverse direction on probe 28. The interior of the lower portion of the housing between transverse member 142 and elastomeric membrane 42 may be filled with a dielectric, as previously described, and a static pressure compensation device 9696 may be employed for equalizing the pressure differential between the housing internal pressure and the fluid pressure, as previously described.

In order to compensate for the effects of gravitational forces exerted on probe 28, a second stem 1496 may be cantilevered within the housing and have a spherical member 148 attached to its free end, as shown. A funnel-shaped member 150 may be located within the housing and have an elastomeric membrane 152 similar to membrane 42 connected to the stem and to the reduced diameter of portion 154 of the funnel-shaped member, as shown. Stem 1496 and spherical member 148 may be substantially identical to stem 296 and probe 28; the elastomeric membrane 152 may be connected to stem 1496 at the same distance from spherical member 148 as membrane 42 is connected to stem 296 in relation to probe 28; and the stem 1496 may be disposed within the same dielectric as stem 296. Thus, the deviation of stem 1496 from the longitudinal axis of the housing due to gravitational forces will be the same in magnitude and direction as the deviation of stem 296 due to the effects of gravitational forces on probe 28. To compensate for the deviation of probe 28 and stem 296 due to gravitational forces, a variable capacitor 158 may be associated with stem 1496 and spherical member 148, as shown. Variable capacitor 158 may be substantially identical to variable capacitor 144, except that the stationary plates 1960 of the variable capacitor 158 are located within the housing diametrically opposed to the stationary plates 1964 of capacitor 144. Accordingly, since the deviation of the two stems 296 and 1496 due to gravitational forces will be identical, the change in capacitance of variable capacitor 144 will be the same as the change in capacitance of variable capacitor 158, only in the opposite direction. Thus, a decrease in capacitance of capacitor 144 by a predetermined amount will be accompanied by an increase in capacitance of capacitor 158 of the same amount. By connecting the two variable capacitors in parallel, the capacitance changes will balance out so that the net change in capacitance due to gravitational effects will be zero, thereby automatically compensating the flowmeter for the effects of gravity. Alternatively, each capacitor 144, 158 may control the frequency of a separate oscillator with compensation being effected in the processing system (to be described) to which the flowmeter is connected. For a two-dimensional flowmeter, each capacitor would have two sets of orthogonally oriented stationary plates, as previously described, with the corresponding stationary plates of each diametrically opposed.

Figure 6A:
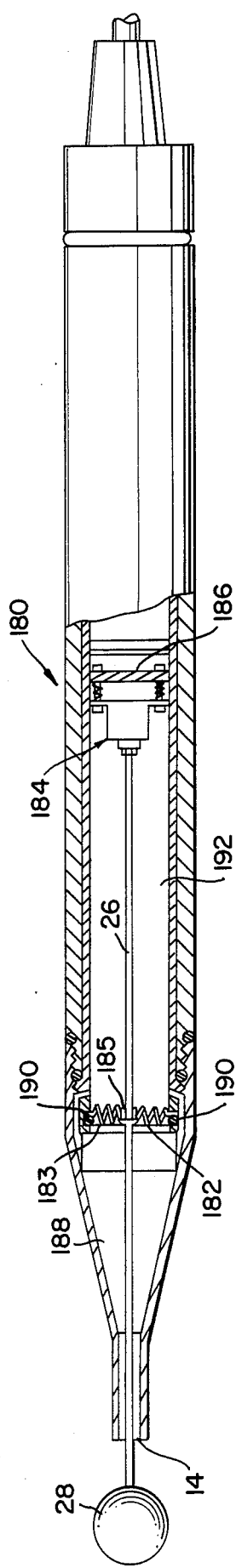
FIG. 6A-C illustrate yet another embodiment of apparatus in accordance with the invention for providing measurement of flow parameters in three dimensions, FIG. 6A being a side view partially broken away of the apparatus.
Figure 6B:
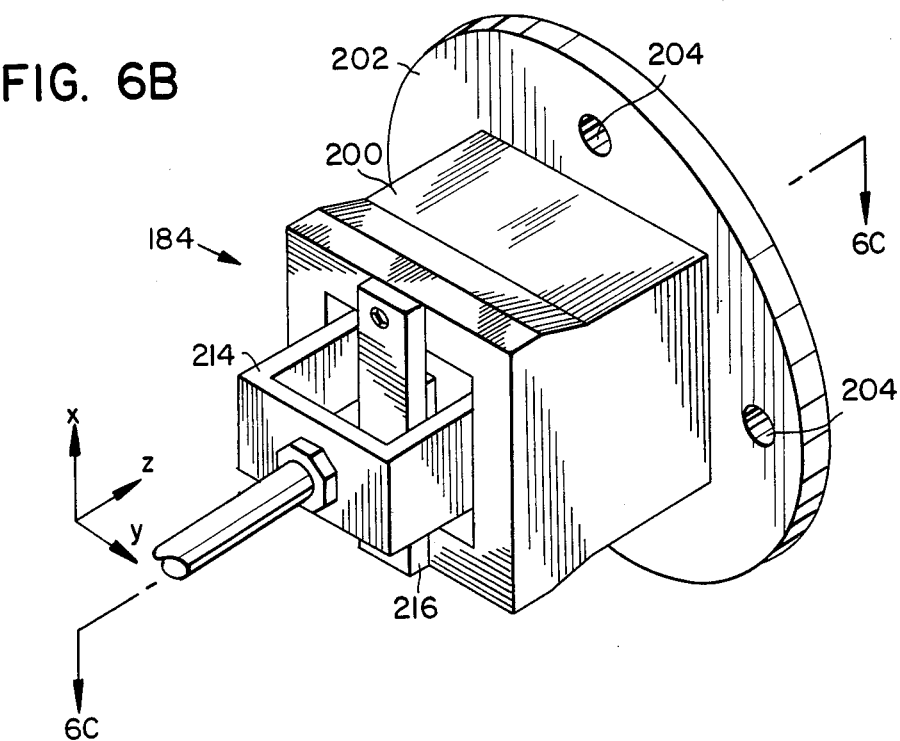
Figure 6C:
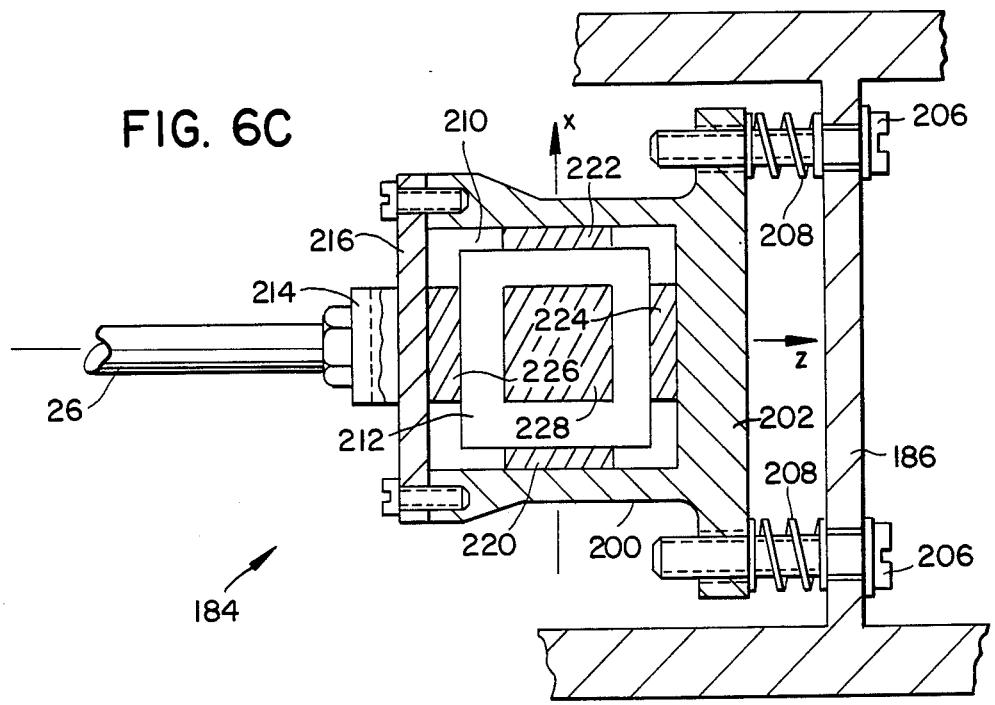

FIGS. 96A-C illustrate another embodiment of a flowmeter 180 in accordance with the invention which affords three-dimensional sensing of fluid flow parameters. As will be described shortly, flowmeter 180 senses fluid forces exerted on probe 28 in an axial direction, as well as in orthognal transverse directions. Flowmeter 180 employs a balanced stem 296 which may be supported within the housing at an intermediate location of the stem by a concentrically corrugated diaphragm 182. Diaphragm 182 may be formed from a thin sheet of high elasticity beryl copper having a thickness of the order 0.05-0.2 mm, for example. The outer rim of the diaphragm may be fixed to a shoulder on the inner surface of the housing, as by a threaded press ring 183, and the center of the diaphragm may be fixed to a shoulder on the stem, as by a nut 185 threaded onto the stem. This gives the stem two degrees of freedom of radial movement and an additional degree of freedom for axial movement corresponding to the three-dimensional forces exerted on the ball probe. The interior end of the stem is connected to a three dimensional semiconductor or cantilevered quartz pressure sensor 184 (illustrated in more detail in FIGS. 6B-C) which is supported on a transverse member 186 within the housing. In this embodiment, opening 14 in the housing adjacent to probe 28 may be uncovered, so that the fluid medium in which the flowmeter is employed enters into the lower portion 188 of the housing between opening 14 and diaphragm 182. Static pressure compensation may be afforded by means of small diameter passageways 190 which connect portion 188 of the housing with a chamber 192 of the housing formed between diaphragm 182 and transverse member 1896. Alternatively, the end 14 of the housing may be sealed with a bellows such as previously described, and static pressure compensation may be provided by a device such as shown in FIG. 4D.

FIGS. 96B and C illustrate the sensor 184 in more detail. As shown, the sensor may comprise a housing formed of a box-like member 200 mounted on a circular flange 202 having threaded openings 204 therein for receiving screws 2096 for mounting the housing on transverse member 1896, as shown in FIG. 96C. Screws 2096 may pass through compression springs 208, as shown, to enable adjustment of the orientation of the sensor relative to the axis of the housing. The interior of box 200 may have formed therein a cavity 210 in which is disposed a block of solid material 212 which is coupled to stem 296 by a generally U-shaped member 214. A cross member 2196 may extend across the top of box 200 between the legs of the U-shaped member 214, as shown in FIG. 96B.

As shown in FIG. 96C, block 212 is sized with respect to cavity 210 such that its sides engage three opposed pairs of semiconductor or cantilevered quartz pressure-type sensors disposed upon the interior surfaces of the cavity 210 and on the underside of cross member 2196. A first pair of sensors 220, 222 senses the deviation of stem 296 in a first x direction. A second pair of sensors, only one of which, 228, is illustrated in FIG. 96C, is disposed at right angles to sensors 220 and 222 in a transverse plane and senses deviations of stem 296 in a y direction at right angles to the x direction. The third pair of sensors comprising sensors 224 and 2296 senses axial deviations of stem 296 in a z direction.

It will thus be appreciated that the block 212 serves as a member for engaging the three opposed pairs of pressure sensing devices which collectively comprise the overall sensor 184. As best shown in FIG. 96C, the block 212 includes at least a portion which is disposed within a zone bounded by all three opposed pairs of pressure sensing devices.

As the stem deviates in a given direction, either transversely to the longitudinal axis of the housing or axially along the longitudinal axis, block 212 applies greater pressure to one of the sensors of the pair in that direction and less pressure to the other sensor of the pair, and the pair of sensors provide a corresponding signal. The three pairs of sensors thus provide signals corresponding to the components of a three-dimensional vector which represents the magnitude and direction of the forces applied to the probe 28, and, accordingly, provide three-dimensional flow information. If flow information is required in only two dimensions instead of three, only two pairs of sensors need be used.

Figure 7:
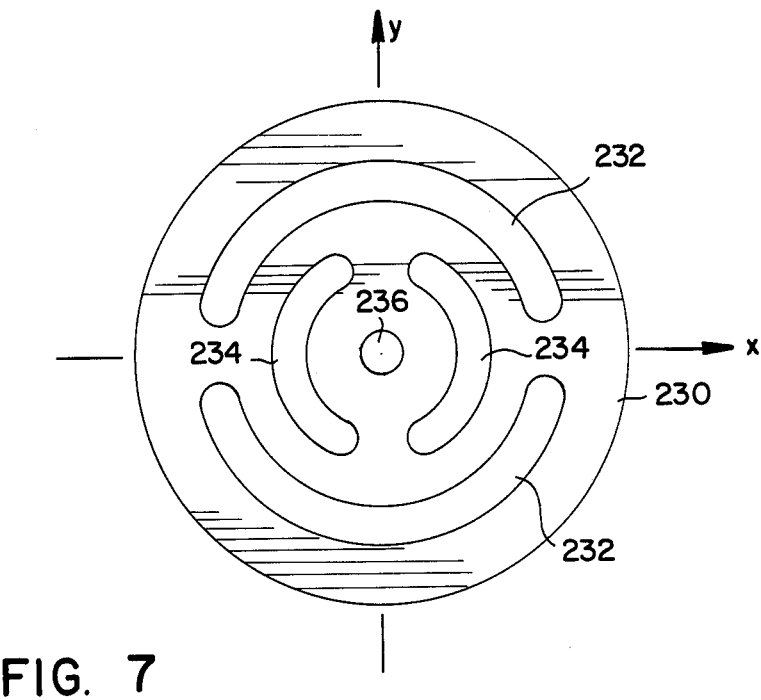
FIG. 7 is a plan view of a spring which may be employed in the invention for affording a two-dimensional apparatus.

FIG. 7 illustrates a universal sheet spring support 230 for affording two-dimensional movement to the stem of a flowmeter, and it may be employed, for example, in place of the gimbal of FIG. 4B or the corrugated diaphragm 182 of FIG. 96A. Spring 230, which may be stamped from resilient sheet metal, may comprise a circular disk having a first pair of diametrically opposed sector-shaped cutouts 232 symetrically oriented with respect to a first axis y, and a second pair of diametrically opposed sector-shaped cutouts 234 symetrically oriented in the circular disk with respect to an orthogonal axis x and at right angles to cutouts 232. The stem may pass through a centrally located hole 2396 and be soldered to the spring. The shapes and orientations of the sector-shaped cutouts enable the stem to pivot in x and y directions and, thus, afford two-dimensional movement to the stem. Spring 230 may be secured within the housing of a flowmeter by a threaded ring or the like.

Figure 8:
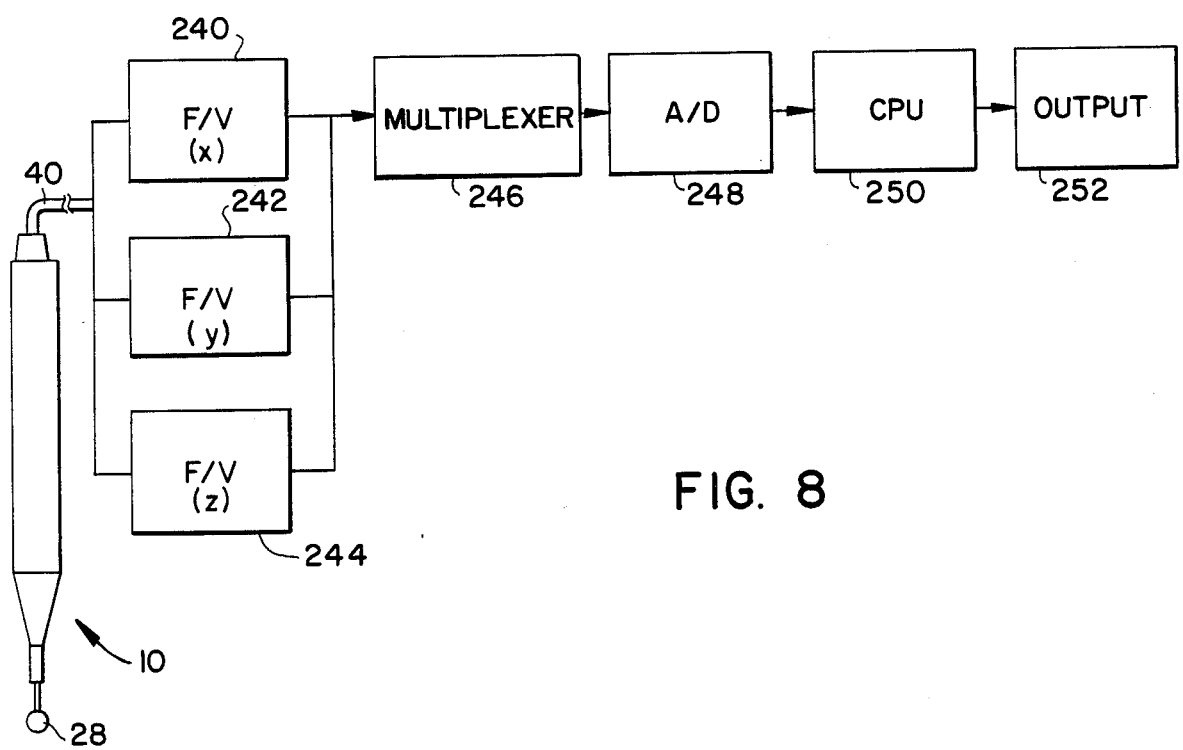
FIG. 8 is a block diagram of a flow parameter measurement system in accordance with the invention.

FIG. 8 illustrates a processing system which may be used for processing signals output from a flowmeter 10 in accordance with the invention. Flow meter 10 may be a three-dimensional flowmeter and provide three output frequencies corresponding to the fluid forces exerted on probe 28 to three dimensions x, y, and z. The three frequencies may each be converted to a voltage in a corresponding frequency-to-voltage converter 240, 242 and 244. The voltages may be then be combined in a multiplexer 2496 and converted to digital signals in an A/D converter 248. The digital signals from the A/D converter may be supplied to a computer for processing, and the computer may provide output signals to an output device 252 to indicate flow parameters such as the magnitude of the flow rate and the direction of flow.

While preferred embodiments of the invention have been shown and described, it will be appreciated by those skilled in the art that changes may be made in these embodiments without departing from the principles and the spirit of the invention, the scope of which is defined in the appended claims.

What is claimed is:

1. Apparatus for measuring fluid flow, comprising an elongated housing having an opening in one end thereof; an elongated stem having an end projecting longitudinally from said housing through said opening; means within the housing at a location remote from said opening for supporting the stem; a probe attached to the projecting end of the stem near said opening for interaction with a flowing fluid and for transmitting to the stem forces exerted on the probe by the flowing fluid; and sensor means within the housing for sensing the forces transmitted to the stem and for producing corresponding electrical signals representative of a measurement of said flowing fluid, and wherein said sensor means comprises a variable capacitor, the capacitance of which varies in response to the forces transmitted to the stem by said probe, and wherein the supporting means supports the stem such that the stem is coaxial with the longitudinal axis of the housing, and the sensor means detects deviation of the stem from said axis, and wherein said stem has a portion which is movable in a direction substantially normal to the longitudinal axis of the housing in response to forces exerted on the probe substantially normal to said longitudinal axis, and the sensor means detects movement of said portion in said direction and, wherein the supporting means supports the stem at an opposite end of the stem from the projecting end and said portion of the stem at which movement is detected by the sensor means comprises an intermediate location of the stem.

2. The apparatus of claim 1, wherein the sensor means is formed to detect two-dimensional movement of the stem in a plane substantially transverse to said longitudinal axis.

3. The apparatus of claim 1 further comprising a flexible elastomeric member surrounding the stem and sealing the opening in the housing through which the stem projects.

4. The apparatus of claim 3 further comprising static pressure compensating means for substantially equalizing the static pressure within the housing to the static pressure of the fluid.

5. The apparatus of claim 4, wherein the interior of said housing is filled with a dielectric, and the static pressure compensating means comprises a flexible member at a side wall of the housing, the flexible member having one side thereof in contact with the dielectric in the interior of the housing and an opposite side in communication with the fluid.

6. The apparatus of claim 4, wherein said static pressure compensating means comprises another opening formed in the housing, the other opening being in communication with the interior of the housing and with said fluid.

7. The apparatus of claim 1, wherein said capacitor being part of a frequency-determining network of an oscillator, and said electrical signals comprising a variable frequency output from said oscillator.

8. The apparatus of claim 5 wherein said variable capacitor comprises at least a first capacitive element mounted to said stem for movement therewith to change its capacitive coupling relative to a second capacitive element, said second capacitive element being fixed relative to said housing.

9. The apparatus of claim 8 wherein movement of said stem changes the capacitive coupling between said first capacitive element and said second capacitive element by causing said first capacitive element to move toward or away from said second capacitive element.

10. The apparatus of claim 8 wherein movement of said stem changes the capacitive coupling between said first capacitive element and said second capacitive element by causing variation of overlapping areas of said first and second capacitive elements.

11. Apparatus for measuring fluid flow, comprising an elongated housing having an opening one end thereof; an elongated stem having an end projecting longitudinally from said housing through said opening; means within the housing at a location remote from said opening for supporting the stem; a probe attached to the projecting end of the stem near said opening for interaction with a flowing fluid and for transmitting to the stem forces exerted on the probe by the flowing fluid; and sensor means within the housing for sensing the forces transmitted to the stem and for producing corresponding electrical signals representative of a measurement of said flowing fluid, and wherein said sensor means comprises a variable capacitor, the capacitance of which varies in response to the forces transmitted to the stem by said probe, and wherein the supporting means supports the stem such that the stem is coaxial with the longitudinal axis of the housing, and the sensor means detects deviation of the stem from said axis, and wherein said stem has a portion which is movable in a direction substantially normal to the longitudinal axis of the housing in response to forces exerted on the probe substantially normal to said longitudinal axis, and the sensor means detects movement of said portion in said direction, and wherein the supporting means supports the stem in a balanced condition at an intermediate location thereof, and the portion at which movement is detected comprises an opposite end region of the stem from the projecting end of the stem to which the probe is attached and, wherein said supporting means comprises a gimbal formed to afford two-dimensional movement of said stem portion in a plane substantially transverse to said longitudinal axis.

12. The apparatus of claim 11, wherein said housing comprises a slender tubular portion extending longitudinally from said opening, the slender tubular portion being formed to surround the stem to protect the stem from forces in a direction transverse to the longitudinal axis of the stem, and being formed to have a small diameter so as to minimize disturbance to the flowing fluid.

13. The apparatus of claim 12, wherein the housing further comprises another larger diameter tubular portion and a transition portion for connecting said larger diameter tubular portion to said slender tubular portion.

14. The apparatus of claim 13, wherein said producing means comprises means for converting said electrical signals to digital signals, means for processing the digital signals, and means for indicating flow rate and direction of flow of said fluid.

15. The apparatus of claim 11 further comprising means responsive to said electrical signals for producing a measurement of the magnitude and direction of the flow of said fluid.

16. Apparatus for measuring fluid flow, comprising an elongated housing having an opening in one end thereof; an elongated stem having an end projecting longitudinal from said housing through said opening; means within the housing at a location remote from said opening for supporting the stem; a probe attached to the projecting end of the stem near said opening for interaction with a flowing fluid and for transmitting to the stem forces exerted on the probe by the flowing fluid; and sensor means within the housing for sensing the forces transmitted to the stem and for producing corresponding electrical signals representative of a measurement of said flowing fluid, and wherein the supporting means supports the stem such that the stem is coaxial with the longitudinal axis of the housing, and the sensor means detects deviation of the stem form said axis, and wherein said stem has a portion which is movable in a direction substantially normal to the longitudinal axis of the housing in response to forces exerted on the probe substantially normal to said longitudinal axis, and the sensor means detects movement of said portion in said direction, and wherein the supporting means supports the stem at an opposite end of the stem from the projecting end and said portion of the stem at which movement is detected by the sensor means comprises an intermediate location of the stem, and wherein the opposite end of the stem which is supported by said support means includes a narrowed portion to enable bending of the stem in response to said forces.

17. Apparatus for measuring fluid flow, comprising an elongated housing having an opening one end thereof; an elongated stem having an end projecting longitudinally from said housing through said opening; means within the housing at a location remote from said opening for supporting the stem; a probe attached to the projecting end of the stem near said opening for interaction with a flowing fluid and for transmitting to the stem forces exerted on the probe by the flowing fluid; and sensor means within the housing for sensing the forces transmitted to the stem and for producing corresponding electrical signals representative of a measurement of said flowing fluid, and wherein said sensor means comprises a pressure sensor which is engaged by said stem and which provides output signals that are a function of the magnitude and direction of the forces exerted on said sensor by said stem, and wherein said pressure sensor comprises a three-dimensional sensor which senses forces exerted on the stem in a longitudinal direction and in orthogonal transverse directions, and wherein said pressure sensor further comprises a member engaging three opposed pairs of pressure sensing devices, said member having at least a portion which is disposed within a zone bounded by all of three opposed pairs of pressure sensing devices, each opposed pair of pressure sensing devices sensing pressure in an orthogonal direction to every other of said opposed pairs of pressure sensing devices.

18. Apparatus for measuring fluid flow, comprising an elongated housing having an opening one end thereof; an elongated stem; means within the housing at a location remote from said opening for movably supporting the stem; probe means adjacent to said opening and connected to said stem for moving said stem in response to forces exerted on the probe means by a flowing fluid; sensor means within the housing for sensing movement of the stem caused by forces exerted on said probe means by the flowing fluid and for producing corresponding electrical signals representative of a measurement of said flowing fluid, and wherein said probe means comprises a flexible diaphragm disposed within the housing substantially transverse to the longitudinal axis of the housing, the stem being connected to said flexible diaphragm, and wherein said supporting means comprises another transversely extending flexible diaphragm supporting the stem at an intermediate location thereof, said other flexible diaphragm being formed to enable the stem to move axially within the housing in response to forces exerted on said first diaphragm in an axial direction and, wherein said stem has an end which projects a short distance beyond said opening, and said probe comprises a small diameter spherical member connected to the projecting end of the stem, and wherein said supporting means comprises a flexible transversely extending diaphragm for supporting the stem for movement in a first direction along the longitudinal axis of the housing and in second and third orthogonal directions in a plane substantially transverse to said longitudinal axis.

19. The apparatus of claim 18, wherein said sensor means comprises a three-dimensional sensor connected to an opposite end of the stem from said projecting end and formed to detect movement of said opposite end in said three directions.

* * * * *

UNITED STATES PATENT AND TRADEMARK OFFICE
CERTIFICATE OF CORRECTION

PATENT NO. : 4,788,869
DATED : December 6, 1988
INVENTOR(S) : Paul Z-f. Li

It is certified that error appears in the above-identified patent and that said Letters Patent is hereby corrected as shown below:

Claim 11, column 12, line 63, after "opening" insert --in--;

Claim 16, column 13, line 49, "longitudinal" should be --longitudinally--;

Claim 16, column 13, line 60, "form" should be --from--;

Claim 17, column 14, line 7, after "opening", insert --in--;

Claim 18, column 14, line 34, after "opening", insert --in--.

Signed and Sealed this

Eighteenth Day of April, 1989

*Attest:*

DONALD J. QUIGG

*Attesting Officer*   *Commissioner of Patents and Trademarks*